United States Patent
Kim et al.

(10) Patent No.: US 9,799,872 B2
(45) Date of Patent: Oct. 24, 2017

(54) BATTERY MODULE (71) Applicant: SAMSUNG SDI CO., LTD., Yongin-si, Gyeonggi-do (KR)

(72) Inventors: Young-Deok Kim, Yongin-si (KR); Jeong-Joo Lee, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 519 days.

(21) Appl. No.: 14/105,680

(22) Filed: Dec. 13, 2013

(65) Prior Publication Data
US 2014/0205889 A1 Jul. 24, 2014

Related U.S. Application Data (60) Provisional application No. 61/754,019, filed on Jan. 18, 2013.

(51) Int. Cl.
H01M 2/20 (2006.01)
H01M 2/10 (2006.01)
H01M 2/30 (2006.01)

(52) U.S. Cl.
CPC ......... *H01M 2/206* (2013.01); *H01M 2/1077* (2013.01); *H01M 2/30* (2013.01); *H01M 2220/20* (2013.01)

(58) Field of Classification Search
None
See application file for complete search history.

(56) References Cited

U.S. PATENT DOCUMENTS

2009/0159311 A1 6/2009 Zheng et al.
2010/0151312 A1 6/2010 Kim et al.
(Continued)

FOREIGN PATENT DOCUMENTS

DE WO2012016644 A1 * 2/2012 ............ H01M 2/20
EP 2-538-469 A2 12/2012
(Continued)

OTHER PUBLICATIONS

Office Action dated Apr. 7, 2014 in corresponding European Patent Application No. 14151046.1.
(Continued)

*Primary Examiner* — Sarah A Slifka
*Assistant Examiner* — Haroon S Sheikh
(74) *Attorney, Agent, or Firm* — Lee & Morse, P.C.

(57) ABSTRACT

A battery module includes a first battery cell, a second battery cell, and a terminal connection member connecting the first and second terminal portions together, and including: a first contact portion, the first contact portion having a first facing portion contacting the first terminal portion, a second contact portion, the second contact portion having a second facing portion contacting the second terminal portion, the second facing portion being spaced apart from the first facing portion in a first direction, an outermost portion of the first contact portion being spaced apart in the first direction from an outermost portion of the second contact portion by a first distance, and a support portion, the support portion extending in the first direction between the first contact portion and the second contact portion, the support portion having an overall length in the first direction that is greater than the first distance.

16 Claims, 6 Drawing Sheets (56) References Cited

U.S. PATENT DOCUMENTS

| | | |
|---|---|---|
| 2010/0266889 A1 | 10/2010 | Kim |
| 2011/0117420 A1 | 5/2011 | Kim et al. |
| 2011/0195284 A1* | 8/2011 | Yasui .................. H01M 2/0242 |
| | | 429/82 |
| 2014/0030933 A1* | 1/2014 | Wiegmann ............ H01M 2/202 |
| | | 439/767 |

FOREIGN PATENT DOCUMENTS

| | | |
|---|---|---|
| KR | 10-2010-0114595 A | 10/2010 |
| KR | 10-2011-0055255 A | 5/2011 |

OTHER PUBLICATIONS

Office Action issued by the Chinese Patent Office dated Jan. 24, 2017 in the examination of the Chinese Patent Application No. 201410019533.4.

* cited by examiner

BATTERY MODULE

CROSS-REFERENCE TO RELATED APPLICATION

The present application claims priority under 35 U.S.C. §119(e) to U.S. Provisional Application No. 61/754,019, filed on Jan. 18, 2013, and entitled: "BATTERY MODULE," which is incorporated herein by reference in its entirety.

BACKGROUND

1. Field

Embodiments relate to a battery module.

2. Description of the Related Art

A high-power battery module using a non-aqueous electrolyte with high energy density has been developed. The high-power battery module is configured as a large-capacity battery module manufactured by connecting a plurality of battery cells in series so as to be used for driving devices, e.g., motors of electric vehicles and the like, which require high power. The battery cells provide energy to an external device or load, e.g., a motor vehicle, electronic device, etc., through an electrochemical reaction.

SUMMARY

Embodiments are directed to a battery module, including a first battery cell, the first battery cell having a first terminal portion, a second battery cell, the second battery cell having a second terminal portion, and a terminal connection member connecting the first and second terminal portions together, the terminal connection member including: a first contact portion, the first contact portion having a first facing portion contacting the first terminal portion, a second contact portion, the second contact portion having a second facing portion contacting the second terminal portion, the second facing portion being spaced apart from the first facing portion in a first direction, an outermost portion of the first contact portion being spaced apart in the first direction from an outermost portion of the second contact portion by a first distance, and a support portion, the support portion extending in the first direction between the first contact portion and the second contact portion and electrically and physically connecting the first and second contact portions, the support portion having an overall length in the first direction that is greater than the first distance.

The support portion may include respective c-shaped sections connecting the support portion to the first and second contact portions, each c-shaped section including a first leg connected to the support portion, a second leg connected to the respective contact portion, and a joining portion connected between the first leg and the second leg.

Each c-shaped section may be in the shape of a continuous curve.

Each c-shaped section may be in the shape of a trilateral member.

The contact portions may be connected to a side of the respective c-shaped sections of the support portion, such that the contact portions are connected at about a midpoint of the respective second legs.

The first facing portion and the second facing portion may face towards one another, the first and second facing portions contacting the respective terminal portions with the respective terminal portions interposed between the first facing portion and the second facing portion.

The first facing portion and the second facing portion may face away from one another, the first and second facing portions contacting the respective terminal portions with the first and second facing portions interposed between the respective terminal portions.

The first and second facing portions may be roughened.

The terminal connection member may be elastically deformable in the first direction, the terminal connection member being configured to press the first and second facing portions against the first and second terminal portions, respectively.

The first and second facing portions may be welded to the first and second terminal portions, respectively.

The terminal portions may project away from the battery cells and the terminal connection member may be installed from an end of the terminal portions, such that the terminal portions are interposed between the support portion and a case of the battery cells.

The terminal portions may project away from the battery cells and the terminal connection member may be installed from a side of the terminal portions, such that the support portion is alongside the terminal portions.

The first battery cell may include a third terminal portion, the third terminal portion being spaced apart from the first terminal portion in a second direction orthogonal to the first direction, the second battery cell may include a fourth terminal portion spaced apart from the second terminal portion in the second direction, and the support portion may be between the first terminal portion and the third terminal portion, and between the second terminal portion and the fourth terminal portion.

Embodiments are also directed to a battery module, including a first battery cell having a first terminal portion, the first terminal portion including a first side and a second side, the first and second sides being connected, a second battery cell having a second terminal portion, the second terminal portion including a third side and a fourth side, the third and fourth sides being connected, and a terminal connection member, the terminal connection member including a first contact portion that contacts the first side, a second contact portion that contacts the third side, and a support portion that connects the first and second contact portions, the support portion overlapping the second and fourth sides.

The first contact portion may have a first facing portion contacting the first terminal portion, the second contact portion may have a second facing portion contacting the second terminal portion, the second facing portion being spaced apart from the first facing portion in a first direction, an outermost portion of the first contact portion being spaced apart in the first direction from an outermost portion of the second contact portion by a first distance, and the support portion may have an overall length in the first direction that is greater than the first distance.

The first and second contact portions may be interposed between the first side and the third side.

The support portion may include respective c-shaped sections connecting the support portion to the first and second contact portions, the c-shaped sections overlapping the second and fourth sides.

The first battery cell may include a third terminal portion spaced apart from the first terminal portion, the second battery cell may include a fourth terminal portion spaced apart from the second terminal portion, and the support portion may be between the first terminal portion and the third terminal portion, and between the second terminal portion and the fourth terminal portion.

The first terminal portion and the first contact portion may be welded together from a side opposite the second side, and the second terminal portion and the second contact portion may be welded together from a side opposite the fourth side.

A first weld may be formed where the first terminal portion and the first contact portion are welded together, and a second weld may be formed where the second terminal portion and the second contact portion are welded together, and the support portion may have an overall length sufficient to extend beyond the first and second weld areas such that outermost portions of the support portion overlap the first and second weld areas.

BRIEF DESCRIPTION OF THE DRAWINGS

Features will become apparent to those of skill in the art by describing in detail example embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
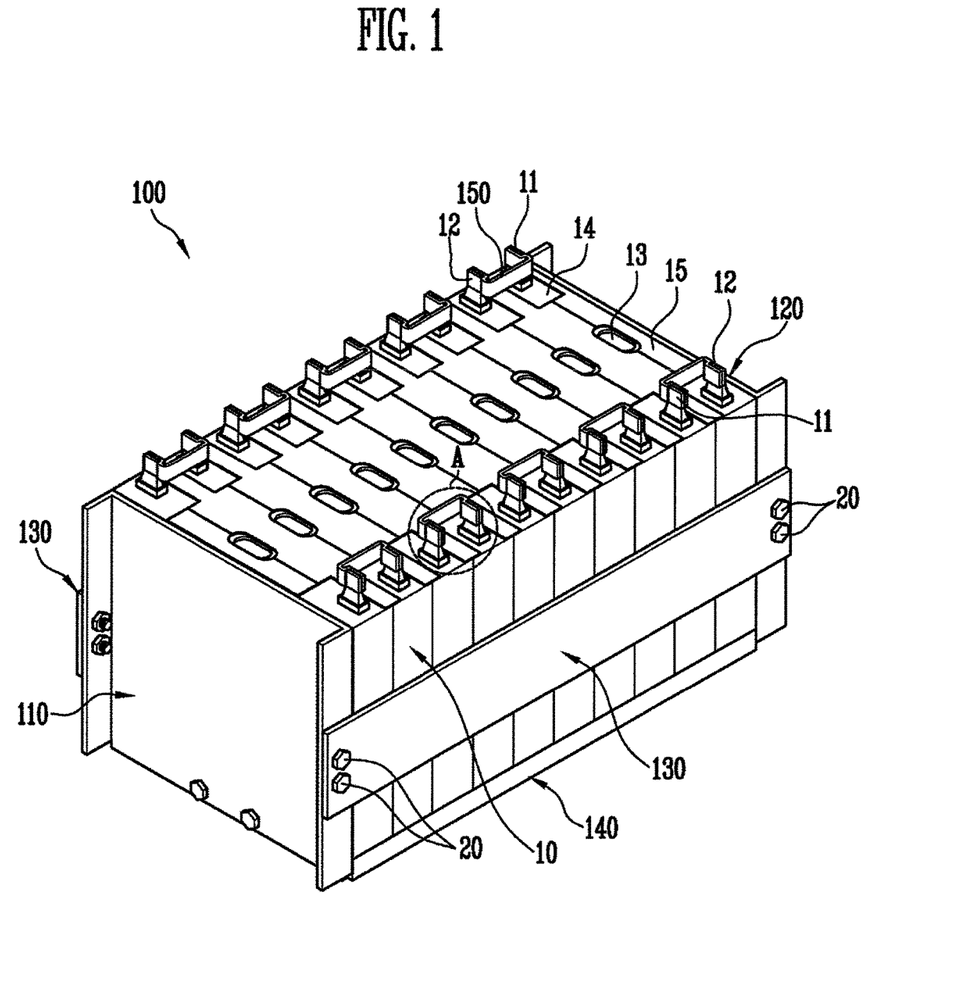
FIG. 1 illustrates a perspective view of a battery module according to an example embodiment.
Figure 2:
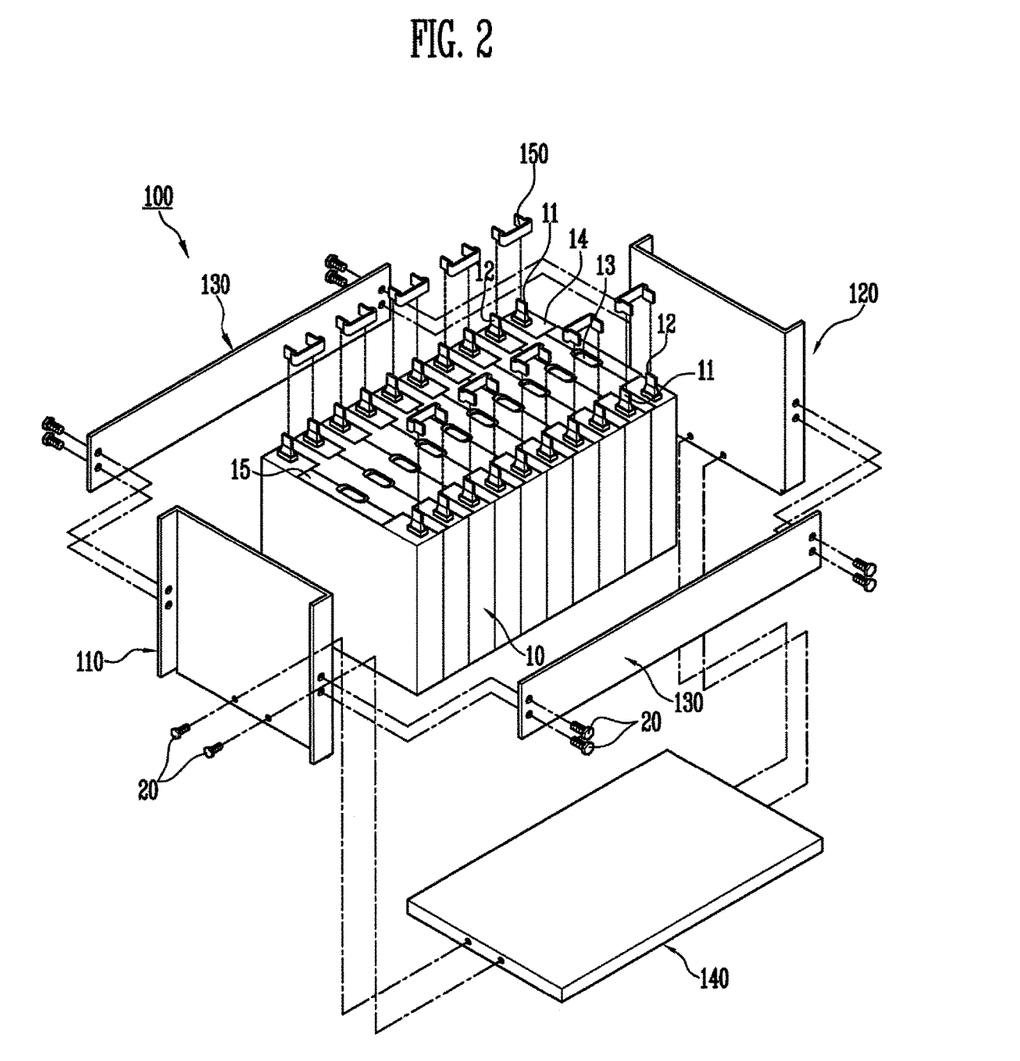
FIG. 2 illustrates an exploded perspective view of the battery module of FIG. 1.

FIG. 1 is a perspective view of a battery module 100 according to an example embodiment. FIG. 2 is an exploded perspective view of the battery module of FIG. 1.

In the present example embodiment, the battery module 100 includes a plurality of battery cells 10 aligned in a first direction and each having respective first and second terminal portions 11 and 12 on a first surface 14 thereof; a terminal connection member 150 connecting terminal portions 11 and 12 of first and second battery cells 10 adjacent to each other; and a housing 110, 120, 130, and 140 accommodating the plurality of battery cells 10 therein. The terminal connection member 150 includes a pair of contact portions 151 provided in parallel while being spaced apart from each other, and a support portion 152 connecting the contact portions 151 to each other. The pair of contact portions 151 may contact the terminal portions 11 and 12 of the first and second battery cells 10, respectively.

The battery cell 10 may include a battery case having the first surface 14, and an electrode assembly and an electrolyte accommodated in the battery case. The electrode assembly and the electrolyte generate energy through an electrochemical reaction therebetween. The first surface 14 of the battery cell 10 is provided with the terminal portions 11 and 12 electrically connected to the electrode assembly, and a vent 13 that is a passage along which gas generated inside the battery cell 10 is exhausted. For example, the terminal portions 11 and 12 may be positive and negative electrode terminals 11 and 12 having different polarities from each other. The terminal portions 11 and 12 of the adjacent battery cells 10 may be electrically connected in series or parallel by the terminal connection member 150. A gasket 15 made of an electrical insulation material may be provided on the first surface 14 of the battery cell 10. The terminal portions 11 and 12 are protruded to the outside of the gasket 15. The terminal portions 11 and 12 of the adjacent battery cells 10 may be connected by the terminal connection member 150 on the gasket 15.

The plurality of battery cells 10 may be aligned in the first direction so that wide surfaces of the battery cells 10 face each other. The aligned battery cells 10 may be fixed by the housing 110, 120, 130, and 140. The housing 110, 120, 130, and 140 may include a pair of end plates 110 and 120 facing the wide surfaces of the battery cells 10, and side and bottom plates 130 and 140 connecting the pair of end plates 110 and 120 to each other. The side plate 130 may support side surfaces of the battery cells 10, and the bottom plate 140 may support bottom surfaces of the battery cells 10. The pair of end plates 110 and 120, the side plate 130, and the bottom plate 140 may be connected by members such as bolts 20.

Figure 3:
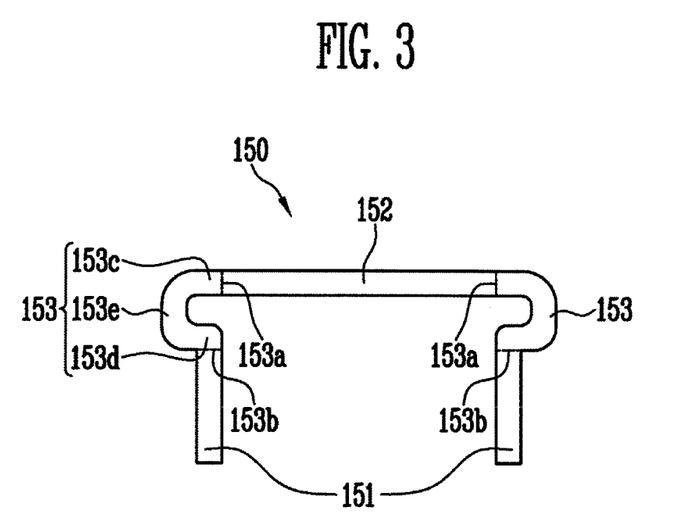
FIG. 3 illustrates a plan view of a terminal connection member according to an example embodiment.
Figure 4A:
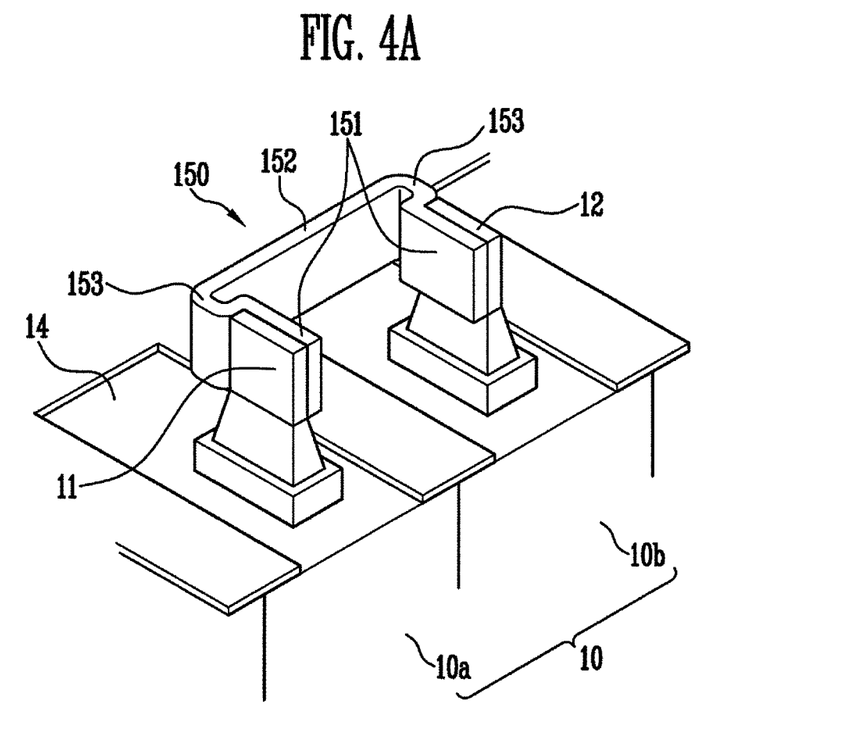
FIG. 4A illustrates an enlarged view of portion A of FIG. 1.
Figure 4B:
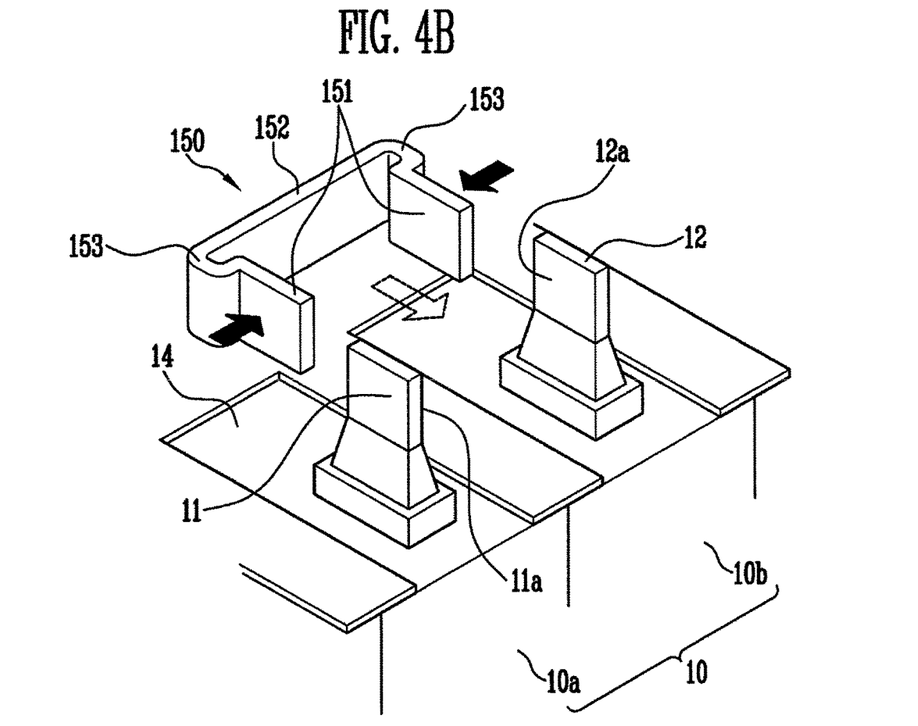
FIG. 4B illustrates an exploded perspective view of FIG. 4A.

FIG. 3 is a plan view of a terminal connection member 150 according to an example embodiment. FIG. 4A is an enlarged view of portion A of FIG. 1. FIG. 4B is an exploded perspective view of FIG. 4A.

Referring to the example embodiment shown in FIGS. 3, 4A and 4B, the terminal connection member 150 may include a pair of contact portions 151 and a support portion 152 connecting the pair of contact portions 151 to each other. In the present example embodiment, the pair of contact portions 151 are spaced apart from each other at a predetermined interval, and the terminal portions 11 and 12 of first and second battery cells 10*a* and 10*b* that are adjacent battery cells 10 may contact the contact portions 151, respectively. The support portion 152 may maintain the spacing distance between the pair of contact portions 151 and adjust the interval between the pair of contact portions 151. For example, the pair of contact portions 151 and the support portion 152 may be connected perpendicular to each other.

The terminal connection member 150 may further include round or c-shaped sections 153, which may be at one and the other ends of the support portion 152, respectively. The c-shaped sections may include a first leg 153c connected to the support portion 152, a second leg 153d connected to the respective contact portion 151, and a joining portion 153e connected between the first leg 153c and the second leg 153d. The contact portion 151 may be connected to the c-shaped section 153 at an end of the c-shaped section 153. For example, the c-shaped section 153 may be formed in a U-shape to connect between the support portion 151 and the contact portion 151. A first end 153a of the c-shaped section 153 formed in the U-shape may be connected in parallel to the support portion 152, and a second end 153b of the c-shaped section 153 may be connected perpendicular to the contact portion 151. The second end 153b of the c-shaped section 153 and the contact portion 151 may be connected perpendicular to each other at a corner of the terminal portion 11 or 12.

The terminal portions 11 and 12 may be made of, e.g., aluminum, copper, etc., and the terminal connection member 150 may be made of, e.g., aluminum. The battery cell 10 may generate high current. Thus, the terminal portions 11 and 12 and the terminal connection member 150 may be provided with a predetermined strength so that the high current stably flows therethrough. Thus, the terminal connection member 150 may have a firm structure so as to have a predetermined strength, but may also have some flexibility provided by the c-shaped section 153. For example, the c-shaped sections 153 may facilitate the bending of the terminal connection member 150, and may have elasticity to facilitate the reciprocating movement of the pair of contact portions 151 connected to the support portion 152. Thus, contact between the terminal portions 11 and 12 and the terminal connection member 150 may be improved while providing assembling tolerance to facilitate the connection between the terminal portions 11 and 12 and the terminal connection member 150.

When one of the adjacent battery cells 10 is referred to as a first battery cell 10a and the other of the adjacent battery cells 10 is referred to as a second battery cell 10b, the terminal portions 11 and 12 of the first and second battery cells 10a and 10b may be electrically connected to each other by the terminal connection member 150. The terminal portion 11 of the first battery cell 10a may include a first facing portion 11a, and the terminal portion of the second battery cell 10b may include a second facing portion 12a facing the first facing portion 11a. The first and second battery cells 10a and 10b may be aligned so that the first and second facing portions 11a and 12a face each other, and the first and second facing portions 11a and 12a may be spaced apart from each other at a predetermined interval. According to the present example embodiment, the pair of contact portions 151 of the terminal connection member 150 are pressed inward to be forcibly inserted between the first and second facing portions 11a and 12a. The pair of contact portions 151 may thus firmly contact the first and second facing portions 11a and 12a, respectively.

As described above, the terminal connection member 150 may be provided with an ability to bend by the c-shaped sections 153 while having a predetermined strength. The pair of contact portions 151 may be bent by an external force so as to be inserted between the first and second facing portions 11a and 12a. After the external force is removed, the elasticity of the terminal connection member 150 may restore the pair of contact portions 151 to contact the respective first and second facing portions 11a and 12a.

In the present example embodiment, one or more portions of each of the terminal portions 11 and 12 may be formed as a hexahedron in which the first and second facing portions 11a and 12a have a quadrangular shape. The section of the contact portion 151 may be provided to correspond to the first or second facing portion 11a or 12a contacting the contact portion 151. The first and second facing portions 11a and 12a and the contact portions 151 may contact each other through their wide surfaces, and thus current may efficiently flow between the first and second battery cells 10a and 10b.

Figure 5:
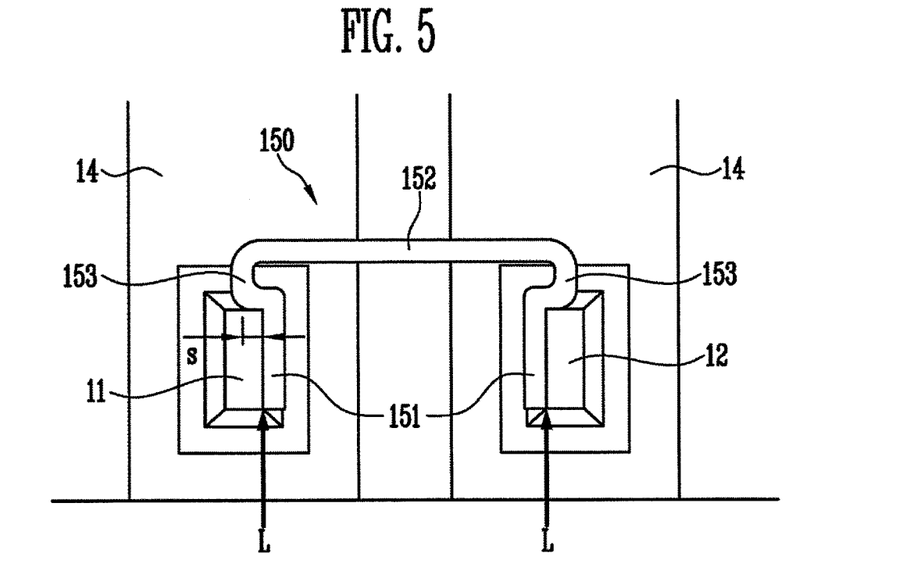
FIG. 5 illustrates a plan view of FIG. 4A.

FIG. 5 is a plan view of FIG. 4A.

Referring to FIG. 5, the terminal portions 11 and 12 of the first and second battery cells 10a and 10b and the terminal connection member 150 may be connected while being adhered closely to each other without being spaced apart. In the present example embodiment, the terminal connection member 150 forms overlaps S where the terminal portions 11 and 12 are overlapped by the c-shaped sections 153. The width of the overlap S may be, e.g., 0.2 to 0.6 mm. The terminal connection member 150 and the terminal portions 11 and 12 may be physically firmly fixed by the fixing force of the housing, fixing the aligned battery cells 10 by pressing inward the aligned battery cells 10, and the elastic restoring force between the contact portions 151 of the terminal connection member 150, forcibly inserted between the first and second facing portions.

In the present example embodiment, a process may be performed to improve adhesion between the terminal connection member 150 and the terminal portions 11 and 12. For example, the terminal connection member 150 and the terminal portions 11 and 12 may be welded to each other by a laser beam L. In the present example embodiment, the laser beam L is provided in parallel with the surfaces of the contact portions 151 and the terminal portions 11 and 12, which face each other, so as to connect the terminal connection member 150 and the terminal portions 11 and 12. For example, in FIG. 5, the laser beam may be directed substantially parallel to the top surface of the battery cell in the direction indicated by the arrows in FIG. 5.

For example, the terminal portions 11 and 12 may include a positive electrode terminal 11 made of aluminum and a negative electrode terminal 12 made of copper, and the terminal connection member 150 may include a bus-bar made of aluminum. The positive electrode terminal 11 and the terminal connection member 150 may be made of the same metal, so as to be easily adhered closely to each other. In case of the negative electrode terminal 12 and the terminal connection member 150, the laser beam L may be provided adjacent to the negative electrode terminal 12, and accordingly, the interface of the terminal connection member 150 contacting the negative electrode terminal 12 may be melted so that the terminal connection member 150 can be adhered closely to the negative electrode terminal 12. Thus, even when the positive and negative electrode terminals 11 and 12 are made of different metals from each other, the terminal connection member 150 and the terminal portions 11 and 12 may be connected using relatively low power without forming the terminal connection portion 150 with clad metal (because the laser beam L is not provided in a direction perpendicular to the direction in which the terminal portions 11 and 12 and the terminal connection member 150 contact each other).

In the terminal connection member 150, the width of the overlap S may be, e.g., 0.2 to 0.6 mm. In the present example embodiment, the overlap S is provided perpendicular to the direction in which the laser beam L is provided, so as to block the transmission of the laser beam L beyond the weld area. Accordingly, it may be possible to prevent the battery cell 10, e.g., the electrode assembly and the electrolyte from being damaged by the laser beam L and heat generated by the laser beam L. The laser beam L may be provided in the form of a beam to a target material by amplified laser and locally heat the target material with a high energy density for a short period of time. As such, it may be possible to minimize the thermal deformation and cooling time of the target material and to effectively perform welding even in a narrow area. In a case where the width of the overlap S is less than 0.2 mm, a portion of the laser beam L may be transmitted even though there is some overlap S, and therefore, the battery cell 10 may be damaged. In a case where the width of the overlapping portion S exceeds 0.6 mm, the size of the terminal connection member 150 may be unnecessarily enlarged, and therefore, a short circuit between adjacent terminal connection members 150 may be possible. Thus, the width of the overlap S may be about 0.2 to about 0.6 mm.

Figure 6:
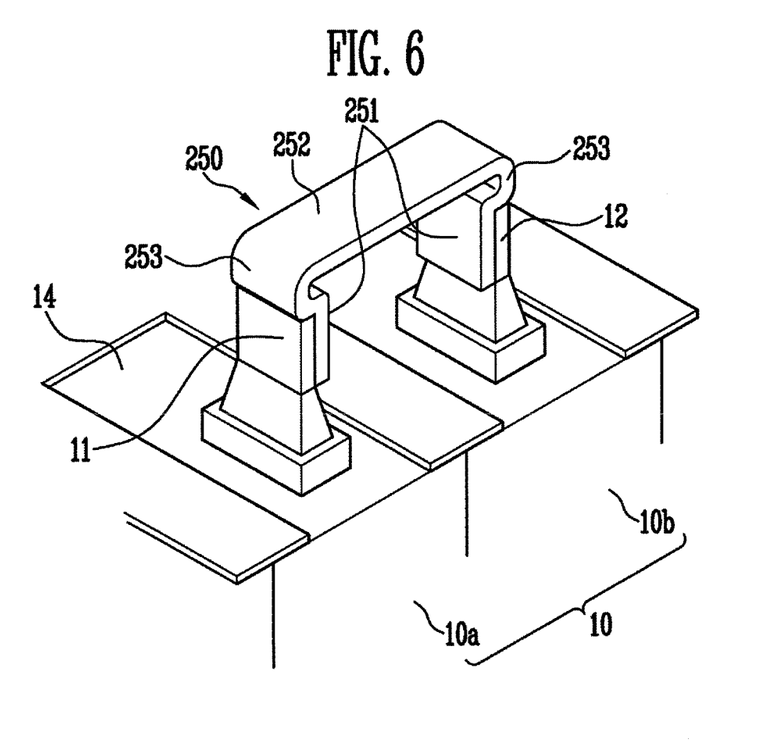
FIG. 6 illustrates a perspective view schematically showing a terminal connection member and a terminal portion according to another example embodiment.

FIG. 6 is a perspective view schematically showing a terminal connection member 260 and a terminal portion according to another example embodiment.

Referring to example embodiment shown in FIG. 6, the terminal connection member 260 may connect the terminal portions 11 and 12 respectively provided to the first surfaces 14 of the first and second battery cells 10a and 10b. The terminal connection member 250 may include a pair of contact portions 251 provided in parallel with each other, a support portion 252 provided approximately perpendicular to the contact portions 251, and a c-shaped section 253 provided to be bent between the contact portion 251 and the support portion 252.

In the terminal connection member 250, the pair of contact portions 251 may be provided to come in surface contact with the terminal portions 11 and 12, respectively. Thus, the terminal portion 11 of the first battery cell 10a and the terminal portion 12 of the second battery cell 10b may face each other while being spaced apart from each other at a predetermined interval. The terminal connection member 250 may be inserted into the interval between the terminal portions 11 and 12 in a direction perpendicular to the first surface 14. In the present example embodiment, the c-shaped sections 253 adjacent to the contact portions 251 contact upper surfaces of the terminal portions 11 and 12, respectively, so as to guide the distance at which the contact portions 251 are inserted between the terminal portions 11 and 12, acting as stops. The terminal connection member 250 is inserted between the terminal portions 11 and 12 above the terminal portions 11 and 12. Thus, the terminal connection member 250 may be easily inserted between the terminal portions 11 and 12 even when the size of the battery cells 10 is small.

Hereinafter, other example embodiments will be described with reference to FIGS. 7 to 9. Contents of these example embodiments, except the following contents, are similar to those of the example embodiment described with reference to FIGS. 1 to 6, and therefore, their details will not be repeated.

Figure 7:
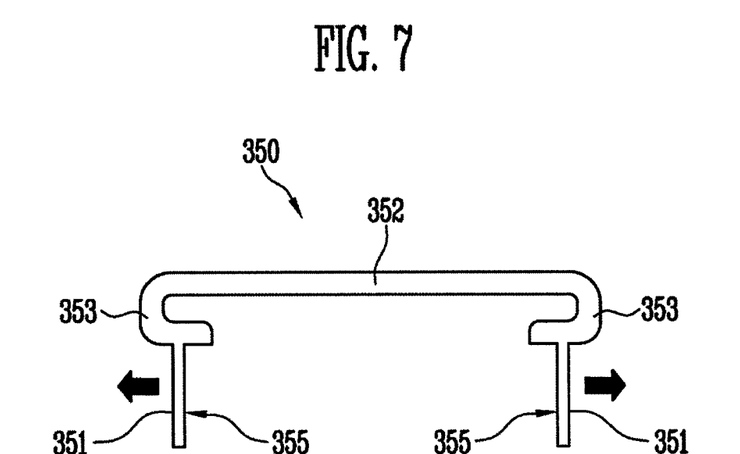
FIG. 7 illustrates a perspective view of a terminal connection member according to still another example embodiment.

FIG. 7 is a perspective view of a terminal connection member according to still another example embodiment. FIG. 8 is a perspective view schematically showing a terminal connection member and a terminal portion according to still another example embodiment.

Figure 8:
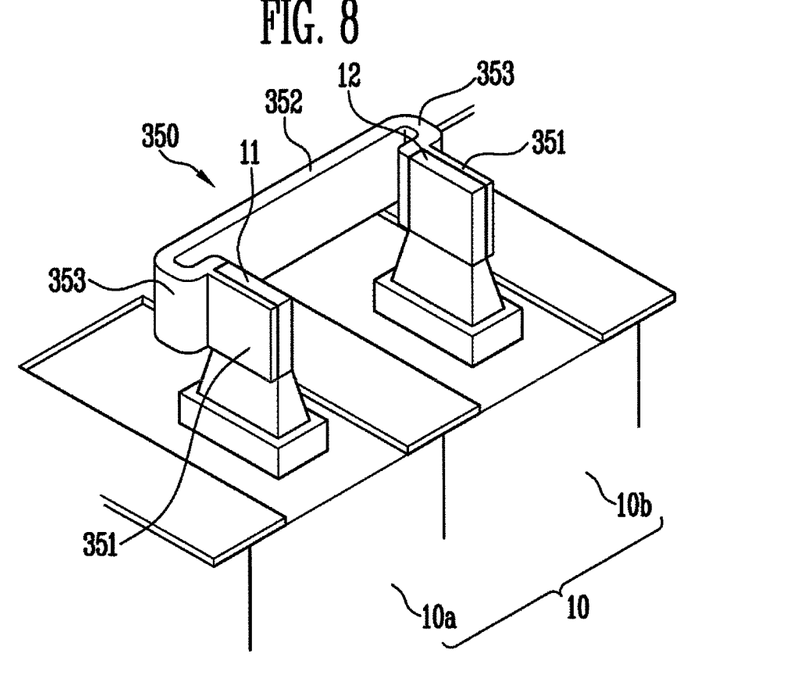
FIG. 8 illustrates a perspective view schematically showing a terminal connection member and a terminal portion according to still another example embodiment.

Referring to FIGS. 7 and 8, the battery module according to this example embodiment may include a plurality of battery cells 10 and a terminal connection member 350 electrically connecting the battery cells 10 to each other. The battery cells 10 include adjacent first and second battery cells 10a and 10b, and terminal portions 11 and 12 respectively provided to the first and second battery cells 10a and 10b may be coupled to the terminal connection member 350.

The terminal portions 11 and 12 of the first and second battery cells 10a and 10b face each other. The terminal portions 11 and 12 may be formed in the shape of a hexahedron, so that the quadrangular sections of the terminal portions 11 and 12 face each other. The terminal connection member 350 may include a pair of contact portions 351 provided in parallel with each other, and a support portion 352 maintaining the spacing distance between the pair of contact portions 351. The terminal connection member 350 may further include c-shaped sections 353. In the present example embodiment, the c-shaped sections 353 are provided at one and the other ends of the support portion 352, respectively, and the contact portion 351 may be connected to an end of the c-shaped section 353.

The support portion 352 and the contact portion 351 are provided perpendicular to each other, and the contact portion 351 may have a stepped portion 355 recessed inwardly. The stepped portions 355 are respectively provided to the surfaces of the pair of contact portions 351, which face each other. Therefore, the stepped portions 355 respectively provided to the pair of contact portions 351 may also face each other.

The terminal portions 11 and 12 of the first and second battery cells 10a and 10b may be electrically connected by the terminal connection member 350. The terminal portions 11 and 12 may be inserted between the pair of contact portions 351. In the present example embodiment, the stepped portions 355 may be provided to have shapes corresponding to the terminal portions 11 and 12, respectively. Therefore, after the terminal portions 11 and 12 are mounted in the respective stepped portion 355, each of the terminal portions 11 and 12 may be provided to form the approximately same plane as peripheral portions of the stepped portion 355. Accordingly, the stepped portion 355 guides the position at which the terminal portion 11 or 12 is provided, and thus the terminal connection member 350 may be easily coupled to the first and second battery cells 10a and 10b.

The terminal connection member 350 according to this example embodiment may electrically connect the first and second battery cells 10a and 10b and simultaneously fix the positions of the first and second battery cells 10a and 10b. The terminal portions 11 and 12 of the first and second battery cells 10a and 10b may be forcibly inserted between the pair of contact portions 351 of the terminal connection member 350, which have a predetermined strength. Thus, the first and second battery cells 10a and 10b may be physically fixed to each other by the terminal connection member 350, and may not easily be moved by an external impact, thereby helping efficiently perform the assembly of the battery module. Accordingly, the terminal connection member 350 may maintain the alignment of the battery cells 10 even when the housing fixing the battery cells 10 is omitted.

Figure 9:
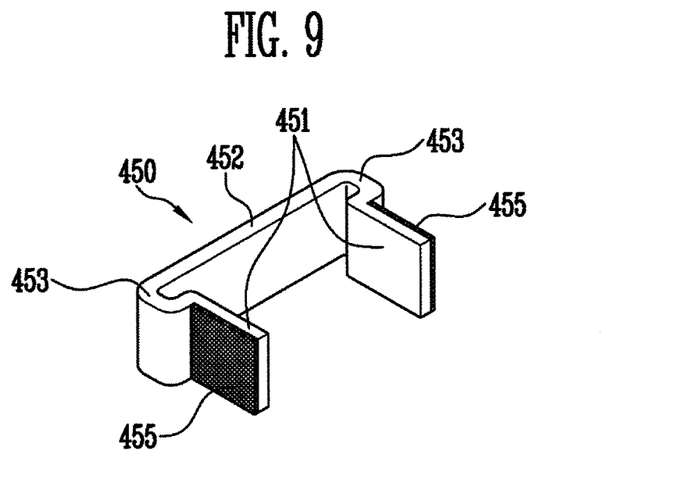
FIG. 9 illustrates a perspective view of a terminal connection member according to still another example embodiment.

FIG. 9 is a perspective view of a terminal connection member according to still another example embodiment.

The terminal connection member 450 according to this example embodiment may be coupled to terminal portions of adjacent battery cells so that the battery cells are electrically connected to each other. The terminal connection member 450 may have a fastening portion 455 provided to a surface contacting the terminal portion. The terminal connection member 450 may include a pair of contact portions 451 directly contacting the respective terminal portions of the battery cells, a support portion 452 maintaining the spacing distance between the pair of contact portions 451, and c-shaped sections 453 facilitating the reciprocating movement of the pair of contact portions 451. In the present example embodiment, the pair of contact portions 415 may be provided to face each other, and the fastening portion 455 may be provided to any one surface of each of the pair of contact portions 451. For example, the fastening portion 455 may include surface roughness.

The terminal connection member 450 may be inserted between the terminal portions of the adjacent battery cells. The terminal connection member 450 and the terminal portion may be implemented as an electrical conductor, and may be made of metal or the like. The fastening portion 455 may increase the frictional force between the terminal connection member 450 and the terminal portion of the battery cell, so as to help improve the coupling between the terminal connection member 450 and the fastening portion 455.

As described above, a battery module may be configured with a plurality of battery cells, the plurality of battery cells being fixed in a housing so as to be used as a single power source. The battery cells may be electrically connected to one another by bus-bars or the like. It is of interest to stably and efficiently maintain high current flowing between the battery cells.

By way of summation and review, embodiments relate to a battery module configured to enhance insulation property and safety. Embodiments may provide a battery module having a terminal connection member. Embodiments may also provide a battery module configured to improving efficiency and safety of current flow.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
   a first battery cell, the first battery cell having a first terminal portion;
   a second battery cell, the second battery cell having a second terminal portion; and
   a terminal connection member connecting the first and second terminal portions together, the terminal connection member including:
   a first contact portion, the first contact portion having a first facing portion contacting the first terminal portion;
   a second contact portion, the second contact portion having a second facing portion contacting the second terminal portion, the second facing portion being spaced apart from the first facing portion in a first direction; and
   a support portion, the support portion extending in the first direction and electrically and physically connecting the first and second contact portions,
   wherein a distance between outermost portions of the terminal connection member in the first direction is less than a distance between an outer side of the first terminal portion and an outer side of the second terminal portion in the first direction, the outer side of the first terminal portion facing away from the outer side of the second terminal portion, and
   wherein the support portion includes one c-shaped section connecting the support portion to the first contact portion and another c-shaped section connecting the support portion to the second contact portion, each c-shaped section including a first leg extending toward the other c-shaped section and connected to the support portion, a second leg extending toward the other c-shaped section and connected to the respective contact portion, and a joining portion connected between the first leg and the second leg such that the one c-shaped section has a concavity that is open toward and faces the other c-shaped section and the other c-shaped section has a concavity that is open toward and faces the one c-shaped section.

2. The battery module as claimed in claim 1, wherein each c-shaped section is in the shape of a continuous curve.

3. The battery module as claimed in claim 1, wherein each c-shaped section is in the shape of a trilateral member.

4. The battery module as claimed in claim 1, wherein the contact portions are connected to a side of the respective c-shaped sections of the support portion, such that the contact portions are connected at about a midpoint of the respective second legs.

5. The battery module as claimed in claim 1, wherein the first facing portion and the second facing portion face away from one another, the first and second facing portions contacting inner sides of the respective terminal portions with the first and second facing portions interposed between the respective terminal portions.

6. The battery module as claimed in claim 1, wherein the first and second facing portions are roughened.

7. The battery module as claimed in claim 1, wherein the terminal connection member is elastically deformable in the first direction, the terminal connection member being configured to press the first and second facing portions against inner sides of the first and second terminal portions, respectively.

8. The battery module as claimed in claim 1, wherein the first and second facing portions are welded to inner sides of the first and second terminal portions, respectively.

9. The battery module as claimed in claim 1, wherein the terminal portions project away from the battery cells and the terminal connection member is installed from an end of the terminal portions, such that the terminal portions are interposed between the support portion and a case of the battery cells.

10. The battery module as claimed in claim 1, wherein the terminal portions project away from the battery cells and the terminal connection member is installed from a side of the terminal portions, such that the support portion is alongside the terminal portions.

11. The battery module as claimed in claim 10, wherein:
   the first battery cell includes a third terminal portion, the third terminal portion being spaced apart from the first terminal portion in a second direction orthogonal to the first direction,
   the second battery cell includes a fourth terminal portion spaced apart from the second terminal portion in the second direction, and
   the support portion is between the first terminal portion and the third terminal portion, and between the second terminal portion and the fourth terminal portion.

12. A battery module, comprising:
a first battery cell having a first terminal portion, the first terminal portion including a first side and a second side, the first and second sides being connected;
a second battery cell having a second terminal portion, the second terminal portion including a third side and a fourth side, the third and fourth sides being connected; and
a terminal connection member, the terminal connection member including a first contact portion that contacts the first side, a second contact portion that contacts the third side, and a support portion that connects the first and second contact portions, the support portion overlapping the second and fourth sides such that a distance between outermost portions of the terminal connection member in a first direction is less than a distance between an outer side of the first terminal portion and an outer side of the second terminal portion in the first direction, the outer side of the first terminal portion facing away from the outer side of the second terminal portion, wherein:
the first contact portion has a first facing portion contacting the first terminal portion,
the second contact portion has a second facing portion contacting the second terminal portion, the second facing portion being spaced apart from the first facing portion in the first direction,
the support portion includes one c-shaped section connecting the support portion to the first contact portion and another c-shaped section connecting the support portion to the second contact portion, each c-shaped section including a first leg extending toward the other c-shaped section and connected to the support portion, a second leg extending toward the other c-shaped section and connected to the respective contact portion, and a joining portion connected between the first leg and the second leg such that the one c-shaped section has a concavity that is open toward and faces the other c-shaped section and the other c-shaped section has a concavity that is open toward and faces the one c-shaped section, and the support portion extends beyond an outermost side of the first contact portion and beyond an outermost side of the second contact portion such that an overall length of the support portion in the first direction is greater than a first distance between the outermost side of the first contact portion and the outermost side of the second contact portion.

13. The battery module as claimed in claim 12, wherein the first and second contact portions are interposed between the first side and the third side.

14. The battery module as claimed in claim 12, wherein:
the first battery cell includes a third terminal portion spaced apart from the first terminal portion,
the second battery cell includes a fourth terminal portion spaced apart from the second terminal portion, and
the support portion is between the first terminal portion and the third terminal portion, and between the second terminal portion and the fourth terminal portion.

15. The battery module as claimed in claim 14, wherein:
the first terminal portion and the first contact portion are welded together from a side opposite the second side, and
the second terminal portion and the second contact portion are welded together from a side opposite the fourth side.

16. The battery module as claimed in claim 15, wherein:
a first weld is formed where the first terminal portion and the first contact portion are welded together, and a second weld is formed where the second terminal portion and the second contact portion are welded together, and
the support portion has an overall length sufficient to extend beyond the first and second weld areas such that outermost portions of the support portion overlap the first and second weld areas.

* * * * *